United States Patent [19]

Kurata

[11] Patent Number: 4,606,429

[45] Date of Patent: Aug. 19, 1986

[54] VEHICLE DRIVE SYSTEM

[75] Inventor: Noboru Kurata, Saitama, Japan

[73] Assignee: Honda Giken Kogyo Kabushiki Kaisha, Tokyo, Japan

[21] Appl. No.: 601,433

[22] Filed: Apr. 18, 1984

[30] Foreign Application Priority Data

Apr. 26, 1983 [JP] Japan .................. 58-73434
Apr. 26, 1983 [JP] Japan .................. 58-73435
Apr. 26, 1983 [JP] Japan .................. 58-73436

[51] Int. Cl.$^4$ .......................................... B62D 21/00
[52] U.S. Cl. ...................................... 180/312; 180/72; 74/15.2; 74/11
[58] Field of Search ............... 180/21, 72, 6.2, 234, 180/271, 312; 280/493, 91; 74/11, 15.2

[56] References Cited

U.S. PATENT DOCUMENTS

| | | | |
|---|---|---|---|
| 3,351,147 | 11/1967 | Williamson | 180/234 X |
| 3,656,572 | 4/1972 | Mercier | 180/21 |
| 3,700,059 | 10/1972 | Sutton | 180/21 X |
| 3,776,354 | 12/1973 | Duclo et al. | 180/72 |
| 4,085,697 | 4/1978 | Gaasenbeek | 180/6.2 X |
| 4,130,172 | 12/1978 | Moody | 180/72 |
| 4,178,873 | 12/1979 | Bankstahl | 180/296 |
| 4,369,851 | 1/1983 | LaBorde | 180/6.66 |
| 4,372,417 | 2/1983 | Yamamoto et al. | 180/215 |

FOREIGN PATENT DOCUMENTS

| | | | |
|---|---|---|---|
| 404456 | 10/1924 | Fed. Rep. of Germany | 180/72 |
| 517306 | 2/1955 | Italy | 180/210 |
| 663212 | 12/1951 | United Kingdom | 180/72 |

Primary Examiner—Larry Jones
Attorney, Agent, or Firm—Lyon & Lyon

[57] ABSTRACT

A vehicle having driving wheels both on the left and right sides of the chassis frame thereof. The vehicle has a power unit including an engine and a transmission system for transmitting the power from an output shaft of the engine to the driving wheels independently. The power unit has a casing constructed as a rigid member supporting the driving wheels and rockably connected through a pivot shaft to the chassis frame so as to permit vertical movement of the driving wheels. The vehicle also includes a differential gear having a case connected to the output shaft. The transmission system includes a left and a right input sections extending from a left and a right side gears of the differential gear and output sections through which the input sections are drivingly connected to respective driving wheels. The output sections include V-belt type automatic transmissions.

11 Claims, 8 Drawing Figures

VEHICLE DRIVE SYSTEM

BACKGROUND OF THE INVENTION

1. Field of the Invention

The present invention relates to a vehicle drive system particularly suitable for small vehicles of the type having driving wheels disposed on both left and right sides of the chassis frame.

2. Description of the Prior Art

Hitherto, the transmission system for vehicles of the kind described has an input section connected to the output shaft of an engine and an output section connected to both driving wheels through a differential gear, wherein the output section is composed of a V-belt type automatic transmission gear. This transmission gear, however, involves a problem that there is a serious reduction of the transmission efficiency due to a slip in the output section particularly under heavy load because the V-belt type automatic transmission must transmit excessive power.

In the vehicle of the kind described, the driving system for the driving wheels and the suspension of the driving wheels are independent of each other. It is quite advantageous from the view point of simplification and compacting of the whole system, for the driving system and the suspension to be constructed integrally by making common use of some of the elements or constituents.

In the vehicle of the kind described, a wheel driving axle is disposed between the pair of driving wheels and the transmission for transmitting the power of the engine disposed at the center of the axle. This transmission occupies a considerably large space. For this reason, there is a practical limit in the reduction of the size of the vehicle while preserving the necessary volume of the vehicle. However, a further reduction in the vehicle size will become possible by disposing the transmission outside of the chassis.

Usually the transmission case for the V-belt type transmission has a split-type construction composed of two parts formed by casting. These two parts are assembled together after assembling the transmission. In order to compensate for the reduction in the rigidity of the transmission case due to the split type construction, it is necessary to increase the wall thickness of the transmission case. This inevitably leads to an increased weight of the transmission as a whole.

SUMMARY OF THE INVENTION

Accordingly, it is a first object of the invention to provide a vehicle in which, in order to eliminate trouble due to excessive loading on the V-belt type automatic transmission in the known vehicle, a pair of automatic transmissions are used to drive corresponding driving wheels of the vehicle, while making an efficient use of the differentiation function of the differential gear in absorbing any difference of speed reduction ratio between the two automatic transmissions.

It is a second object of the invention to provide a vehicle having a simple and compact construction and improved to preserve a sufficient vertical stroke of the driving wheel while diminishing the angle of oscillation of wheels, without increasing the unsprung weight.

It is a third object of the invention to provide a vehicle in which the transmission is disposed outside the chassis frame to save space and the casing of the power unit, consisting of the engine and the transmission, is used as the suspension for the driving wheels to simplify the driving wheel suspension system and, further, the auxiliary equipment such as starting motor, is mounted by making an efficient use of the dead space outside the power unit, without substantial increase of the moment of inertia of the power unit, thereby to achieve a simple and compact construction of the vehicle as a whole, as well as a high comfortableness.

It is a fourth object of the invention to provide a vehicle having a light-weight and rigid transmission case constructed to eliminate the necessity for the split type construction.

To these ends, according to the invention, there is provided a vehicle having driving wheels both on the left and right sides of the chassis frame thereof comprising: a power unit including an engine and a transmission system for transmitting the power from an output shaft of the engine to the driving wheels independently, the power unit having a casing constructed as a rigid member supporting the driving wheels and rockably connected through a pivot shaft to the chassis frame so as to permit the vertical movement of the driving wheels; and a differential gear having a case connected to the output shaft; the transmission system including a left and a right input sections extending from a left and a right side gears of the differential gear and output sections through which the input sections are drivingly connected to respective driving wheels, the output sections including V-belt type automatic transmissions.

The invention provides also a vehicle of the type stated above, characterized by comprising a reduction gear through which the output shaft is connected to the crankshaft of the engine, the pivot shaft being disposed in the vicinity of the reduction gear.

The invention provides further a vehicle of the type stated above, wherein the engine is disposed at the front side of the chassis frame, the input sections of the transmission being extended to left and right sides of the engine, while the output sections of the same are extended rearwardly so as to sandwich the chassis frame therebetween, the vehicle further comprising a suspension spring device disposed between the transmission casing and the chassis frame, and auxiliary equipment annexed to the engine and attached to the left and right side surfaces of the engine in the close proximity of the input sections.

The invention provides still further a vehicle of the type stated above, wherein each of the V-belt type transmissions has a transmission case composed of a seamless case body having a cylindrical form diverging from the end near the input section towards the opposite end and opened at the end surface adjacent to the output shaft, and a cover member attached to the case body so as to close the open surface.

In the vehicle of the invention having the construction described hereinbefore, since a pair of V-belt type automatic transmissions are used for driving a pair of driving wheels, each automatic transmission is required only to bear a light load which is almost a half of that born by the V-belt type automatic transmission in the conventional vehicle. Consequently, the loss of power due to a slip in the automatic transmission is reduced by almost a half to permit a remarkable increase of the transmission efficiency. In addition, since the input shafts of the pair of automatic transmissions are connected to the output shaft of the engine through a differential gear, any difference of the speed reduction ratio between two automatic transmissions, attributable to the difference of the speed changing characteristics of the transmissions, can be absorbed by the differentiation function of the differential gear, so as to ensure the straight running of the vehicle. When the vehicle turns, the two automatic transmissions perform a differentiation function to lighten the differentiation load on the differential gear to contribute to a further increase of the differentiation efficiency.

Moreover, the casing of the power unit functions as the swing arm for suspending the driving wheels to permit a vertical movement of the driving wheels. The casing can function also as a stabilizer for suppressing the vibration of the driving wheels. Thus, it is possible to eliminate the specific swing arm and the stabilizer so that the driving and suspension systems as a whole are simplified and made compact.

In addition, the pivot shafts are disposed in the vicinity of the reduction gear which in turn takes a position between the engine and both automatic transmissions. Consequently, the moment of inertia of the swingable system around the pivot shafts including both driving wheels and the power unit can be made sufficiently small regardless of the size of the reduction gear to reduce the unsprung weight, thereby to ensure a good road follow-up characteristics of the wheels and, accordingly, good comfort for the driver.

In addition, it becomes possible to use only one reduction gear commonly used for both of the transmissions, so that the construction can be simplified without necessitating a final reduction gear at the output side of each automatic transmission.

The space between the input section and the output section of the transmission can be effectively used as the vehicle space so that the vehicle as a whole can be made compact while preserving a sufficiently large internal volume of the vehicle body.

It is to be noted also that the auxiliary equipment, such as the starting motor, is attached to the left and right side surfaces of the engine in the close proximity of the input section so that space between the engine and the input section can be utilized effectively as the space for accomodating auxiliary equipment. This contributes not only to the compact construction of the vehicle as a whole but also to a minimization of the increase of the moment of inertia of the power unit attributable to the addition of the auxiliary equipment of the engine, thereby to improve the road follow-up characteristics of the vehicles to ensure good comfort for the driver.

As to the casting of the transmission case, the core can be separated from the open surface of the casing so that the transmission case can be formed as an integral body without any seam. The seamless construction of the transmission case permits a reduction in the wall thickness of the transmission case without any reduction of the rigidity. This in turn affords a reduction in the weight of the transmission case. In addition, since the output shaft side of the transmission case has ample space to accommodate a driven pulley or the like driven wheel of a considerably large diameter, the reduction ratio of the V-belt type automatic transmission can be selected freely.

These and other objects, features and advantages of the invention will become more clear from the following description of the preferred embodiments taken in conjunction with the accompanying drawings.

BRIEF DESCRIPTION OF THE DRAWINGS

The accompanying drawings show an embodiment of the invention in which.

DESCRIPTION OF THE PREFERRED EMBODIMENT

The invention will be more fully understood from the following description of the preferred embodiment when the same is read in conjunction with the accompanying drawings.

Figure 1:
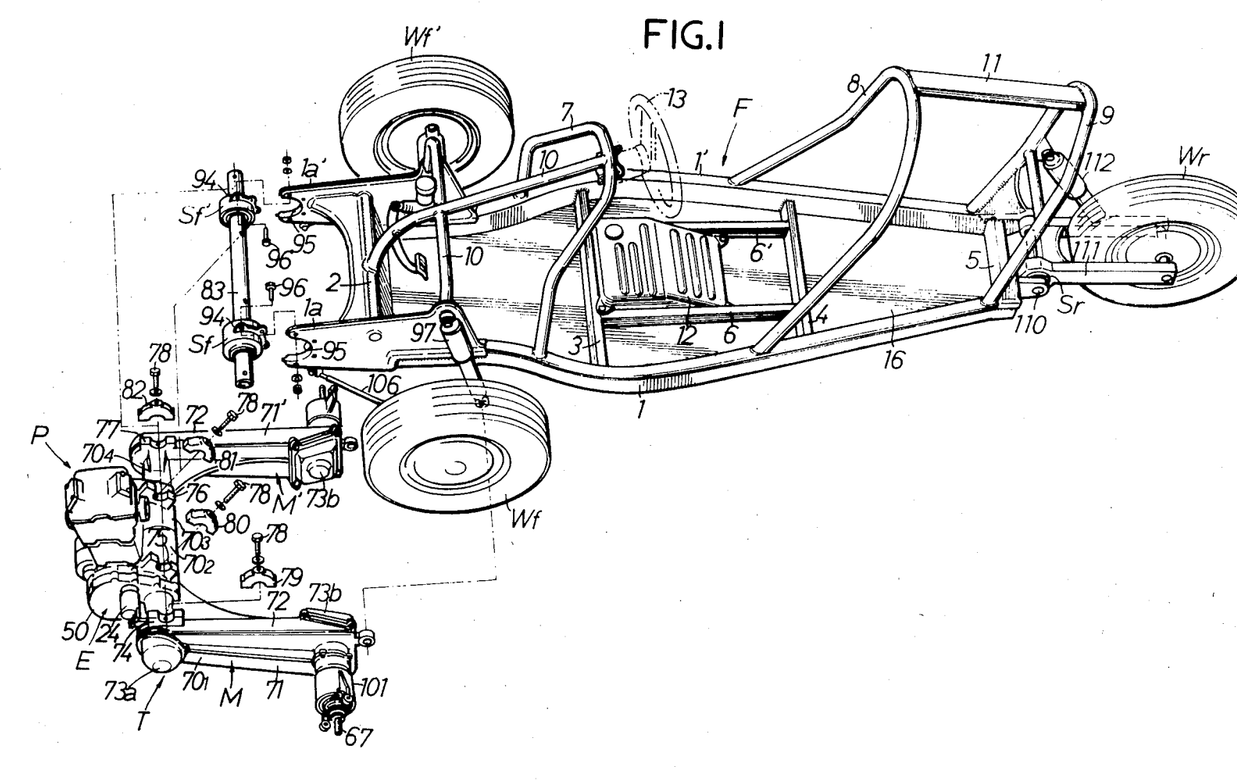
FIG. 1 is an exploded perspective view of a vehicle in a state in which a power unit has been separated from the vehicle chassis.
Figure 2:
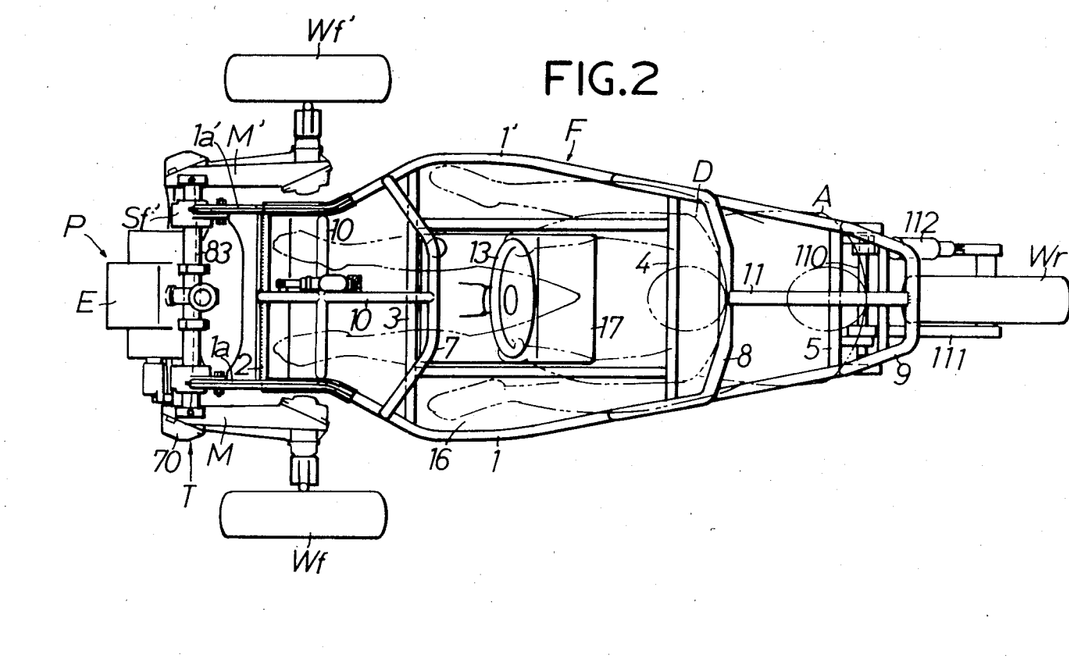
FIG. 2 is a plan view of the vehicle.
Figure 3:
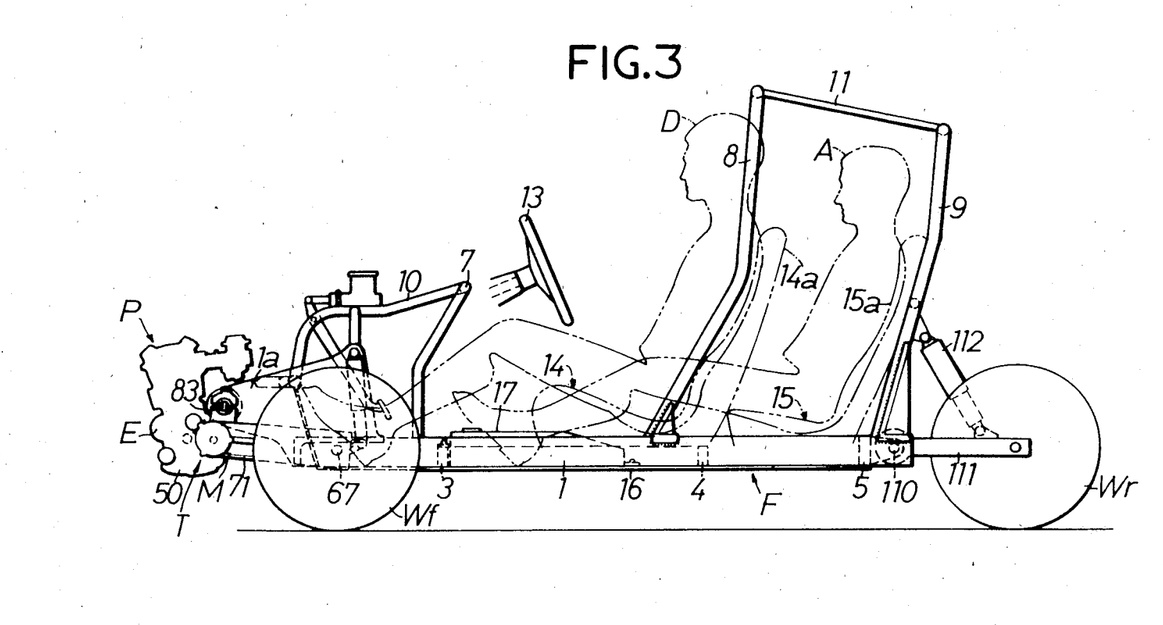
FIG. 3 is a side elevational view of the vehicle.

Referring to FIGS. 1 to 3, a vehicle embodying the present invention, constructed as a three-wheeled vehicle, has a frame F provided at its front portion with both left and right driving wheels Wf and Wf' adapted to be driven by a power unit P which is mounted also on the front portion of the frame F. A non-powered wheel Wr is disposed on the rear side of the frame F.

The chassis frame F is composed of a left and a right longitudinal members 1,1' having support plates 1a, 1a' standing upright from the front ends thereof, a plurality of transverse members 2,3,4 and 5 connecting both longitudinal members 1,1' to form a lattice-like structure, a pair of reinforcement members 6,6' which connect intermediate transverse members 3,4 to each other, and inversed U-shaped roll bars 7,8 and 9 connected to the front, central and rear portions of the longitudinal members 1,1' so as to connect these members 1,1' to each other. The front roll bar 7, front-most transverse member 2 and both side plates 1a,1a' are connected through a cross-shaped reinforcement member 10. The central roll bar 8 and the rear roll bar 9 are connected to each other at their tops through a reinforcement member 11. A steering column for supporting a steering wheel 13 is attached to the center of the roll bar 7. A fuel tank 12 is disposed between the pair of reinforcement members 6,6' so as to extend along the longitudinal axis of the frame, i.e. the line extending in parallel with and equally spaced from both longitudinal members 1,1'. This fuel tank 12 is secured to the transverse member 3 and both reinforcement members 6,6' by means of bolts.

A floor panel 16 is attached to the lower side of the frame F. A front seat 14 for the driver D and a rear seat 15 for a passenger A are mounted on the upper side of the frame F. Back rests 14a and 15a of these seats are disposed to extend along the central roll bar 8 and the rear roll bar 9, respectively. The roll bars 8 and 9 are tall enough to clear the heads of the driver D and passenger A.

Figure 4:
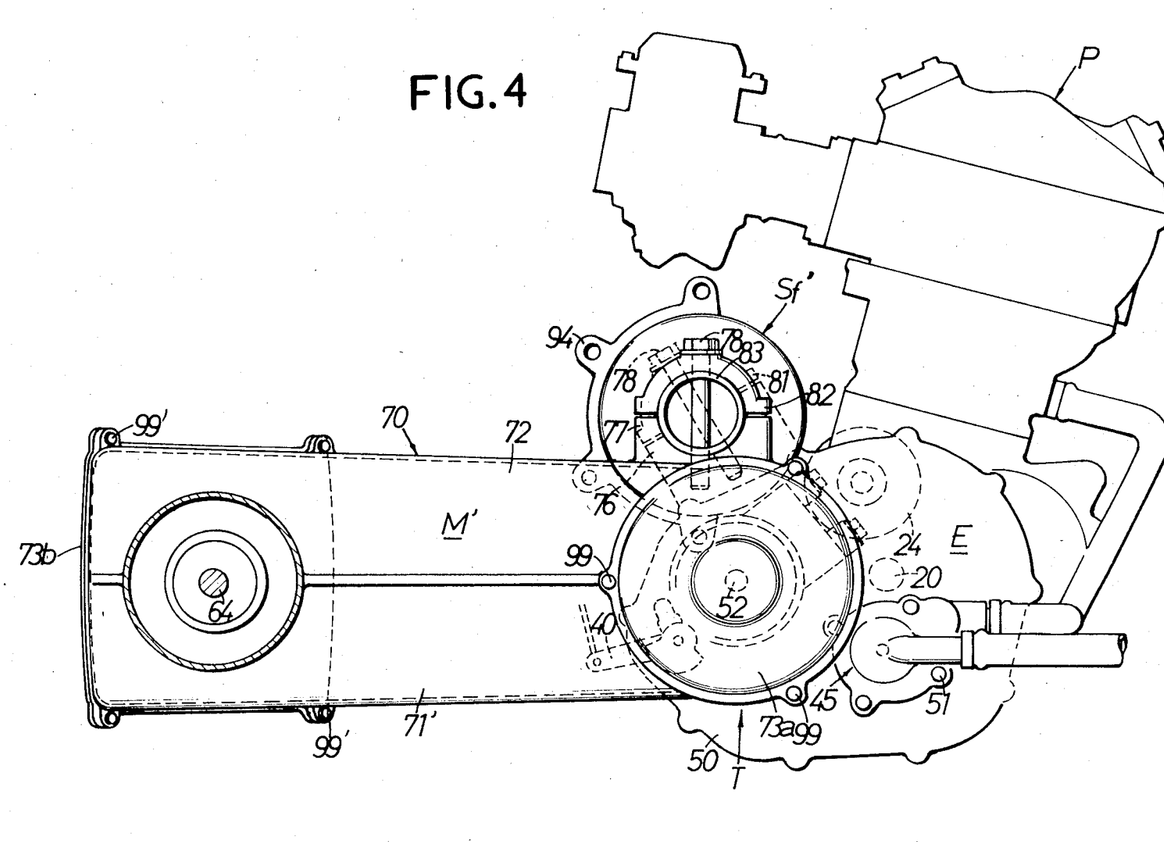
FIG. 4 is a side elevational view of the power unit.
Figure 5:
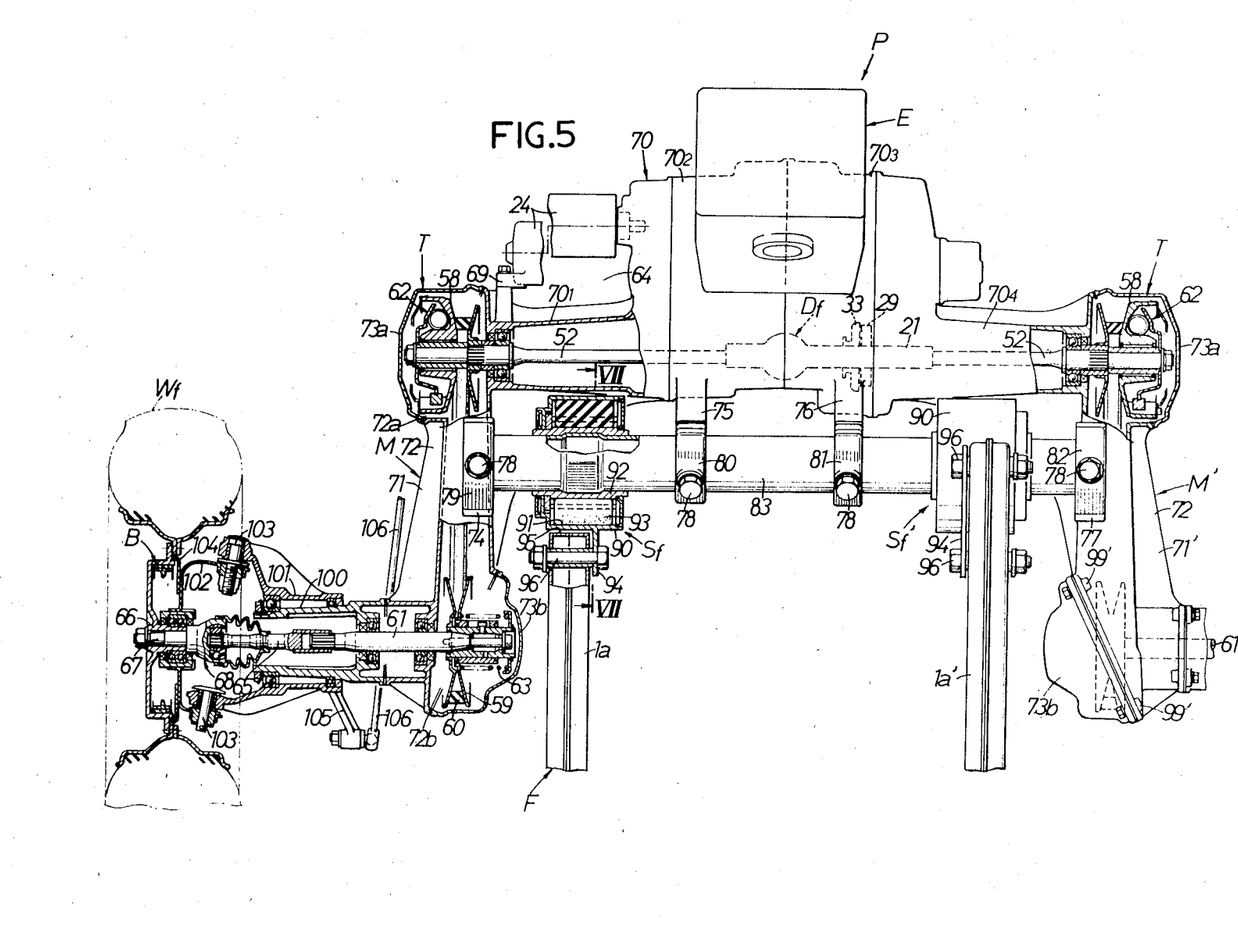
FIG. 5 is a plan view of the power unit with an essential portion thereof being sectioned.
Figure 5A:
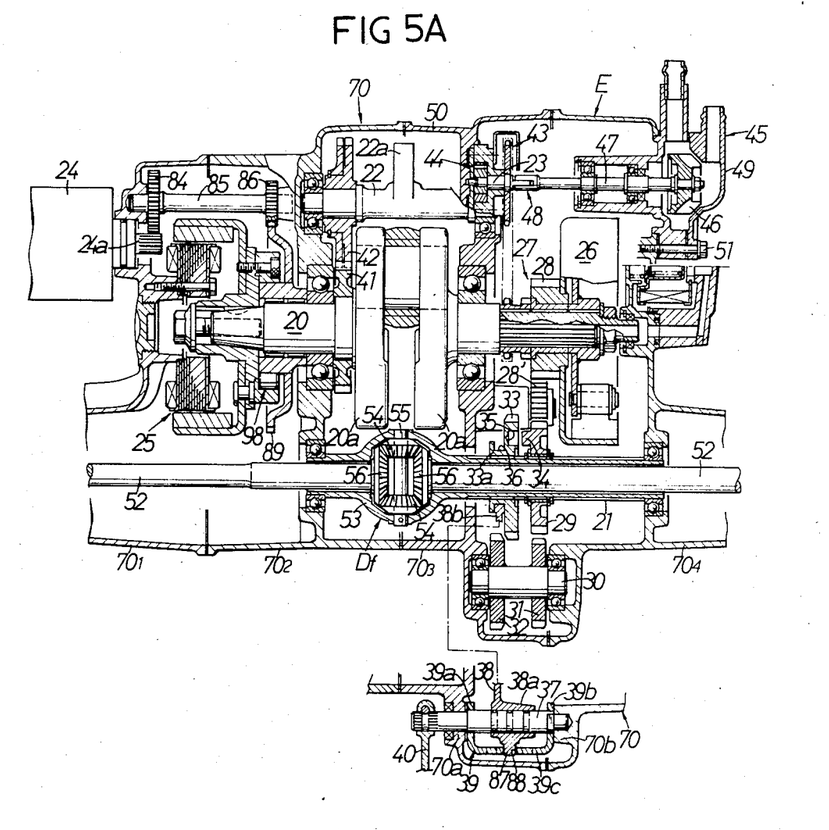
FIG. 5A is an enlarged vertical sectional view of an engine incorporated in the power unit.
Figure 6:
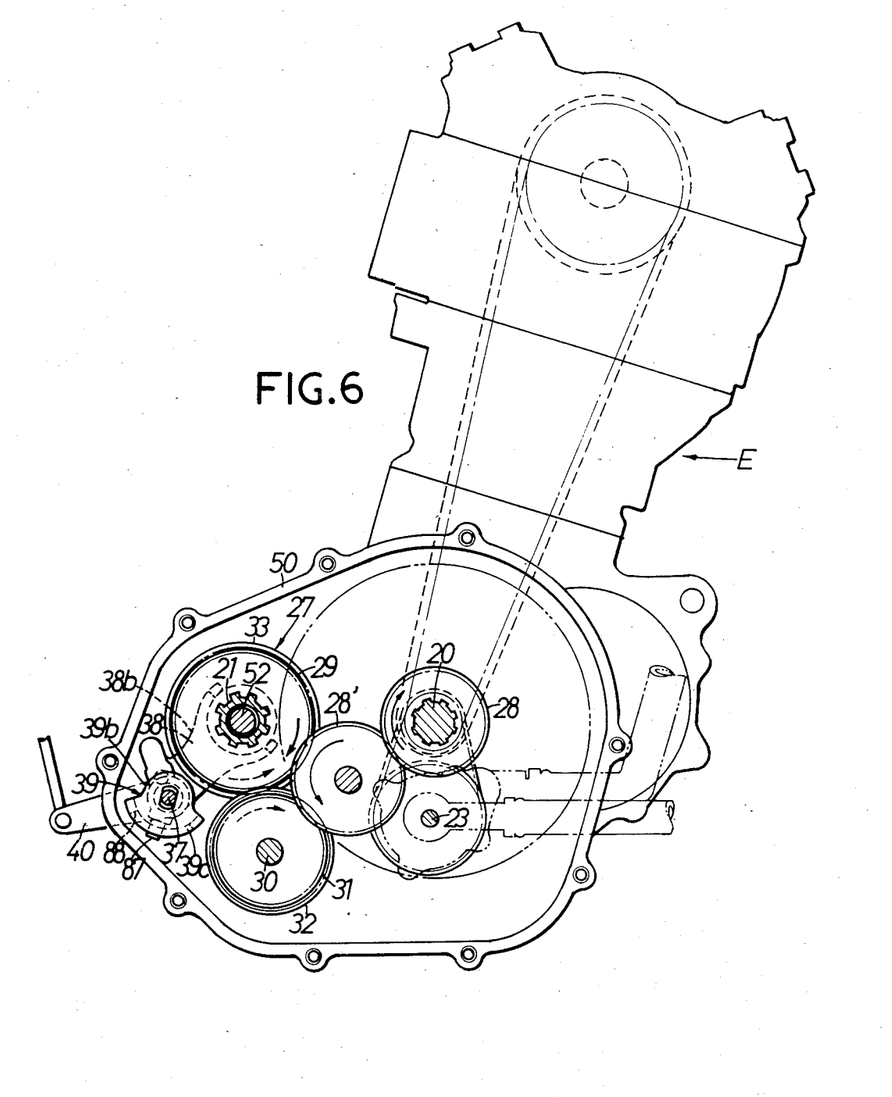
FIG. 6 is a side elevational view of the power transmission system around the engine.

Referring to FIGS. 4 to 6, the power unit P is composed of an engine E and a transmission T connected to the rear side of the engine E.

The engine E has a crankshaft 20 disposed on the central portion of the frame F so as to extend transversely of the chassis frame F. The engine further has an output shaft 21 disposed in parallel with and at the rear side of the crankshaft 20, and also a primary inertia balancing shaft 22 and a pump driving shaft 23 which are disposed at the front side of the crankshaft so as to extend in parallel with the latter. A starting motor 24 is disposed adjacent to the left end of the crankshaft 20. A generator 25 and a centrifugal automatic clutch 26 are connected to the left end and right end of the crankshaft 20, respectively. A reduction gear 27 having a reversing function is connected between the clutch 26 and the output shaft 21. The reduction gear 27 is disposed at an offset to the right side from the central axis of the engine E perpendicular to the crankshaft so that the weight of the reduction gear 27 balances the weight of the starting motor 24.

The reduction gear 27 is composed of a driving gear 28 having a small diameter and fixed to the output member of the clutch 26, an intermediate gear 29 having a larger diameter rotatably carried by the output shaft 21 and always meshing with the driving gear 28 through the idle gear 28', a first idle gear 31 having a small diameter rotatably carried by an idle shaft 30 and always meshing with the driving gear 28 through the idle gear 28', a second idle gear 32 having a large diameter and integrally connected to the first idle gear 31, and a change-over gear 33 slidably splined to the output shaft 21 and disposed adjacent to the intermediate gear 29 and the second idle gear 32. The change-over gear 33 is movable along the output shaft 21 between the right-side position as viewed in FIG. 5 which is the forward driving position and the left-side position which is the reverse driving position, past a central position and a neutral position. For the forward driving condition, there is a dog clutch having a dog 34 and a dog hole 35 which engage the change-over gear 33 and the intermediate gear 29, respectively. For the reverse driving position, the dog clutch is released and the change-over gear 33 meshes with the second idle gear 32.

When the change-over gear 33 is in the forward driving position, the rotation of the crankshaft 20 is transmitted to the output shaft 21 through the clutch 26, driving gear 28, idle gear 28', intermediate gear 29 and the change-over gear 33, so that the output shaft 21 is driven in the forward direction at a reduced speed to drive the vehicle forwardly. As the change-over gear is shifted to the reverse driving position, the rotation of the crankshaft 20 is transmitted to the output shaft 21 through the clutch 26, driving gear 28, idle gear 28', first idle gear 31, second idle gear 32 and the change-over gear 33, thereby to drive the output shaft 21 in the reverse direction at a reduced speed, so that the vehicle runs backward.

The shifting of the change-over gear 33 is effected by the following gear change-over device. A shift fork supporting shaft 37, extending in parallel to the output shaft 21, is rotatably supported by a pair of bearings 70a and 70b provided on the casing 70 of the power unit P. An operation lever 40 is fixed to the left end of the shift fork supporting shaft 37 projecting outwardly from the casing. The manual shifting force from a shift lever (not shown) is transmitted to the shift fork supporting shaft 37 through this operation lever 40.

A shift fork 38 has a boss 38a which is slidably fitted to the shift fork supporting shaft 37. The shift fork 38 has a fork portion 38b engaging an annular groove 36 provided in the outer periphery of the boss 33a of the change-over gear 33, so as to engage the boss portion 33a.

A shift drum 39 is fixedly attached to the shift fork supporting shaft 37. The shift drum 39, which is formed by press, is comprised of a pair of end walls 39a, 39b disposed at positions adjacent to the bearings 70a and 70b and penetrated and supported by the shift fork supporting shaft 37, and a body portion 39c connecting the two end walls 39a and 39b. The body portion 39c is coaxial with the shift fork supporting shaft 37 and surrounds substantially half the circumference of the boss portion 38a. The fitting portions of the right end wall 39b of the shift drum 39 and the shift fork suporting shaft 37 have a common cross-sectional shape in the form of a partly-removed circle, so that both members 37 and 39 rotate as a unit with each other. However, these members 37, 39 are prevented from moving in the axial direction because of the presence of both bearings 70a and 70b. A cam groove 88 is formed in the body 39c of the shift drum 39. An engaging projection 87 engageable with the cam groove 88 is formed in the outer side surface of the boss portion 38a of the shift fork 38.

When the change-over gear 33 is in the neutral position, the shift fork 38 is in a central position on the shift fork shaft 37. Then, as the shift lever 40 is operated to rotate the shift drum 39 in one or the other direction, the shift fork 38 is moved to the right or left due to the function of the cam groove 88, so that the change-over gear 33 is shifted to the forward driving position or to the reverse driving position.

The output shaft 21 has a hollow construction with an internal bore which receives at both its ends the inner ends of a pair of input shafts 52,52 which in combination constitute the transmission input section. These input shafts 52,52 are connected to the output shaft 21 through a differential gear Df. The differential gear Df has a case 53 which is formed as a unit with an intermediate portion of the output shaft 21. As in the case of an ordinary differential gear, the case 53 mounts a pinion shaft 55 carrying pinion gears 54,54. A pair of side gears 56, 56 meshing with respective pinion gears 54,54 are splined to the input shafts 52,52, respectively.

The input shafts 52, 52 extend such that their outer ends project laterally from the engine E. A pair of V-belt type automatic transmissions M,M' constituting the output section of the transmission T, are connected to the projected ends of the input shafts 52,52. Thus, the automatic transmissions M,M' are connected to the output shaft 21 of the engine E through the intermediary of the differential gear Df. Both automatic transmissions M,M' are disposed to extend substantially rearwardly at both sides of the chassis frame F. The left and right driving wheels Wf and Wf' are connected to the output shafts 61,61 of the automatic transmissions M,M', through mechanisms which will be detailed later.

Only the construction of the left automatic transmission M will be described in detail because both transmissions M and M' have an identical construction. A driving pulley 58 of variable diameter is connected to the end of the input shaft 52, while a driven pulley 59 having a variable diameter is connected to the output shaft 61. An endless V-belt 60 is stretched between the pulleys 58 and 59. The driving pulley 58 has a centrifugal mechanism which increases its effective diameter in accordance with the increase of the rotation speed. On the other hand, the driven pulley 59 has a spring mechanism which continuously acts to tend to increase the effective diameter of the driven pulley 59. The centrifugal mechanism 62 and the spring 63 cooperate with each other to automatically and gradually decrease the reduction ratio in accordance with the increase of the rotation speed of the input shaft 52.

A wheel driving shaft 65 is splined to the outer end of the output shaft 61. A wheel axle 67 fixed to the hub 66 of the driving wheel Wf is connected to the wheel driving shaft 65 through a constant velocity joint 68.

The power of the engine E is produced in the form of output torque through the output shaft 21. The output torque is distributed to the left and right input shafts 52,52 through the case 53, pinion shaft 55, pinion gears 54,54 and side gears 56,56, and the torque of both input shafts 52 is transmitted to corresponding driving wheels Wf, Wf' to drive the latter through the driving pulleys 58, V belts 60, driven pulleys 59, output shafts 61 and the wheel driving shafts 65.

As the rotation speed of the input shaft 52 is increased as a result of an acceleration of the engine, the reduction ratio between the input and output shafts 52 and 61 is decreased due to an interaction between the centrifugal mechanism 62 and the spring 63, so that the driving wheels Wf,Wf' are driven at a high speed.

If a difference of the speed reduction ratio occurs between the automatic transmissions M and M' while the vehicle is running straight with the driving wheels Wf,Wf' rotating at equal speeds, the differential gear Df produces its inherent differentiation function to afford a difference of rotation speed between both input shafts 52, 52. Thus, the differential gear Df absorbs any difference in the speed reduction ratio to permit both driving wheels Wf and Wf' to rotate at equal speeds.

The differential gear Df produces the differentiation function also during the turning of the vehicle to afford a difference of the rotation speed between the left and right input shafts 52,52. Simultaneously, both automatic transmissions M and M' cooperate with each other to produce a differentiation function. Namely, when the vehicle is driven around a corner, the rotation speed of the input shaft 52 associated with the driving wheel on the radially inner side of the corner, e.g. the left wheel, is lowered. As a result, the speed changing ratio between the input and output shafts 52 and 61 is increased in the left automatic transmission M. On the other hand, in the right automatic transmission M', the speed changing ratio between the input and output shafts 52 and 61 is decreased because the speed of the input shaft 52 associated with the right driving wheel is increased. Consequently, a difference of rotation speed corresponding to the difference between the lengths of paths of wheels around the corner is developed between the driving wheels Wf and Wf'. This conveniently unburdens the differential gear Df.

The primary inertia balancing shaft 22 is driven by the crankshaft 20 in synchronism with the latter through a driving gear 41 and a driven gear 42 of an equal diameter. The balancing shaft 22 carries a weight 22a which is so located as to be positioned between a pair of crank webs 20a,20a on the crankshaft 20 when the same approaches the crankshaft 20. The balancing action performed by this weight 22a for attaining a balance of the primary inertia force of the engine E is well known and, hence, will not be described in detail here.

The pump driving shaft 23 is driven by the crankshaft 20 through a chain transmission device 43. A lubrication pump 44 is connected to one end of the pump driving shaft 23, while a cooling water pump 45 is connected to the other end of the pump driving shaft 23. The cooling water pump 45 is constructed for easy mounting and demounting as will be understood from the following description.

The water pump 45 has a shaft 47 carrying an impeller 46. The shaft 47 is connected to the pump driving shaft 23 through a telescopic joint 48. A pump housing 49 carrying the rotary shaft 47 and accommodating the impeller 46 is fixed to the crank case 50 of the engine by means of bolts 51. Therefore, the cooling water pump 45 can easily be demounted from the engine E by removing the bolts 51 to facilitate maintenance. When the engine E is an air-cooled type, the water pump 45 is demounted as described and the opening in the crank case left open after the removal of the cooling water pump housing is covered by a suitable closure member.

The power unit P has a casing 70 which is an integral rigid structure including the crank case 50 accommodating the crankshaft 20 of the engine E, output shaft 21 and so forth, and a pair of transmission cases 71,71' extending rearwardly from the left and right ends of the crank case so as to accommodate the automatic transmissions M and M'. Both transmission cases 71,71' are disposed substantially horizontally so as to sandwich the front end of the chassis frame F from both lateral sides thereof. According to this arrangement, it is possible to make an efficient use of the space between the transmission cases 71 and 71' as an accommodation space for the driver to permit a compact construction of the vehicle. This arrangement contributes also to the lowering of the position of the weight center of the power unit P.

The casing 70 is cast in several blocks. Namely, the casing 70 is divided into two sections at the center of the crank case 50, and each section is divided into two blocks at a position intermediate the transmission case 71,71' and the crank case 50, along planes perpendicular to the axis of the crank shaft 20. These blocks are referred to as the first to fourth blocks $70_1$.–$70_4$, as counted from the left side in FIG. 5. Adjacent blocks are connected to each other by means of bolts.

Supporting brackets 74, 75, 76 and 77 are formed integrally with respective blocks $70_1$ to $70_4$ to project outwardly therefrom. A pivot shaft 83 parallel to the crankshaft 20, adapted for connecting the power unit P to the chassis frame F, is disposed between the supporting brackets 74 to 77 and supporting caps 79, 80, 81 and 82 which are connected to these supporting brackets 74 to 77 through bolts 78. The supporting surfaces on the supporting brackets 74 to 77 and the supporting surfaces of the supporting caps 79 to 82 have a semi-circular configuration which permits an easy machining and close adherence to the peripheral surface of the pivot shaft 83. In order to correctly position the pivot shaft 83 with respect to the casing 70 and to attach the pivot shaft 83 firmly to the casing 70, the bolts 78 are made to extend through the pivot shaft 83. Consequently, the first to fourth blocks $70_1$ to $70_4$ are connected also through the pivot shaft 83 so that the strength of connection of these blocks is further increased.

The adjoining surfaces between the associated supporting bracket and cap, i.e. bracket and cap 74 and 79, 75 and 80, 76 and 81, and 77 and 82 are offset from one another in the circumferential direction of the pivot shaft 83. By so doing, comparatively weak portions of the supporting brackets 74 to 77 and bolts 78 are distributed in the circumferential direction thereby to firmly support the pivot shaft 83.

Figure 7:
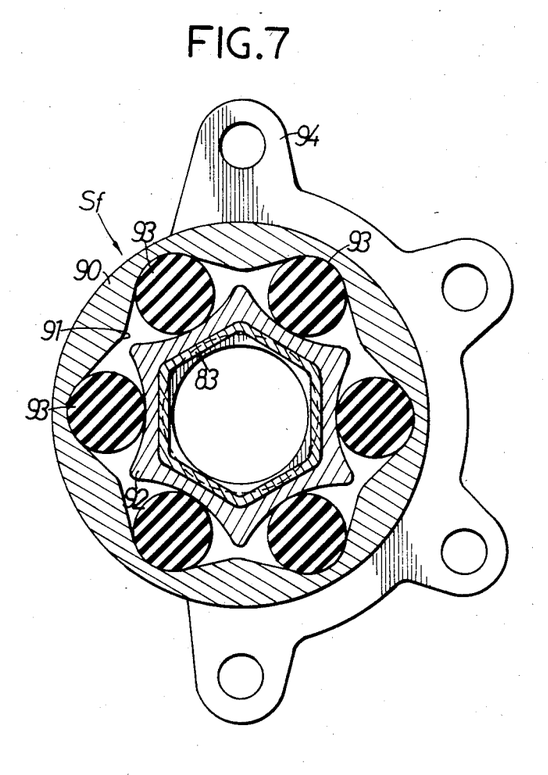
FIG. 7 is a vertical sectional view taken along the line VII—VII of FIG. 5.

The pivot shaft 83 is supported by the left and right supporting plates 1a,1a' of the frame F through left and right Neidhart springs Sf,Sf' arranged in a pair at the inner sides of outer supporting brackets 74 and 71. Since these Neidhart springs Sf and Sf' have an identical construction, only the left one Sf will be described by way of example. The Neidhart spring Sf has, as shown in FIG. 7, a housing 90 having a spring chamber 91 of a basically hexagonal cross-section, a spring operation member 92 having a basically hexagonal cross-section and received in the spring chamber 91 for rotation relative thereto, and six cylindrical rubber springs 93 charged in the spaces between the housing 90 and the spring operation members 92 at the six apexes of the spring chamber 91. The spring operation member 92 is fixed to the pivot shaft 83 through a multi-face fitting or by means of a spline. A flange 94 is formed on the outer peripheral surface of the housing 90 to project therefrom substantially over a half circumference of the housing 90.

Semicircular supporting recesses 95 opening forwardly are formed in the supporting plates 1a,1a' of the chassis frame F. The housings 90 mentioned above are fitted in these recesses 95 with the mounting flange 94 thereof fixed to the supporting plates 1a,1a' by means of a plurality of bolts 96.

As the power unit P is swung around the pivot axis 83 as a result of vertical movement of the driving wheels Wf and Wf', the spring operation member 92 as a whole is rotated with respect to the housing 90 to impart a compression deformation to all the rubber springs 93, so that the driving wheels Wf and Wf' are resiliently suspended by the reactional force produced by the rubber springs 93. As stated before, the casing 70 of the power unit P constitutes a rigid member which connects both driving wheels Wf and Wf' to each other. Thus, the casing 70 of the power unit P functions as a stabilizer which damps the vertical oscillation of one of the driving wheels by the other driving wheel.

In order to damp the vertical oscillation of both driving wheels Wf and Wf', hydraulic dampers 97 are disposed between the supporting plates 1a,1a' of the chassis frame F and corresponding transmission case 71,71'.

The pivot shaft 83 is disposed in the vicinity of the reduction gear 27 and the input section of the transmission T, i.e. close to the input shafts 52,52. This arrangement permits a balance of weight between the mass of engine E of the power unit and the mass of the driving wheels Wf,Wf' around the pivot shaft 83. It is, therefore, possible to minimize the moment of inertia of the oscillation system around the pivot shaft 83 to improve the road follow-up characteristics of the driving wheels Wf,Wf' and to unburden the Neidhart springs Sf,Sf'.

The starting motor 24 as auxiliary equipment annexed to the engine is also disposed in the vicinity of the input section of the transmission T and is secured to the left or the right side surface of the engine E. The motor 24 is also supported by the casing 70 through a supporting member 69. According to this arrangement, it becomes possible to make an efficient use of the space 64 between the engine E and the input section as the space for accomodating the starting motor 24. In addition, the motor 24 is disposed in the vicinity of the pivot shaft 83 so that the increment of the moment of inertia of the power unit P due to the addition of the starting motor 24 can be minimized.

The starting motor 24 has an output gear 24a which is drivingly connected to the reduction gear 89 on the crankshaft 20 through a large-diameter gear 84, a connecting shaft 85 straddling over the generator 25, and a small-diameter gear 86. The reduction gear 89 and the crankshaft 20 are drivingly connected to each other through an over-running clutch 98 which can transmit the driving power only in one direction, i.e. only from the gear 89 to the crankshaft 20. With this arrangement, it is possible to effect the cranking of the crankshaft 20 to start up the engine by means of the starting motor 24 from the outer side of the generator 25.

Each of the transmission cases 71,71' has a seamless case body 72 which has a cylindrical form diverging from the input shaft 52 towards the output shaft 61. The front end surface of the case body 72 is opened forwardly of the vehicle and outwardly to present a slant open surface 72a. The slant opened surface 72a is usually closed by a front lid 73a which is detachably secured to the case body 72 by means of bolts 99. Similarly, the rear end surface of the case body 72 is opened to present a slant open surface 72b which opens rearwardly of the vehicle and inwardly. The open surface 72b is closed by a rear lid 73b detachably secured to the case body 72 by means of bolts 99'.

The casting of the case body 72 is accomplished by means of a mold in which is placed a core corresponding to the internal cavity and front and rear slant open surfaces 72a,72b. The core can easily be parted from the cast article despite the seamless construction of the case body 72 because the internal cavity of the case body 72 diverges towards the rear open end surface 72b. In addition, each of the automatic transmissions M,M' can have a sufficiently large speed reduction ratio because the output-side end of the case body 72 has a large space to accommodate a driven pulley 59 of a considerably large diameter. The assembling or maintenance of the automatic transmission M,M' are conducted through the open surfaces 72a, 72b after removing the lids 73a, 73b. In the described embodiment, since the open surfaces 72a and 72b are slanted as described before, the automatic transmissions M and M' become accessible both from front and rear sides and both lateral sides to provide a high efficiency of the work.

A supporting sleeve 100 surrounding the wheel driving shaft 65 is connected to a housing formed integrally on the outer side surface of each of the transmission cases 71,71' or may be integrally formed as part of the cases. The supporting sleeve 100 rotatably supports an outer sleeve 101. To the outer sleeve 101 is connected a knuckle 102 rotatably carrying the hub of the corresponding driving wheel Wf,Wf', through a pair of king pins 103 arranged coaxially at both sides of the oscillation center of the aforementioned constant velocity joint 68. The knuckle 102 is connected to the steering wheel 13 through a steering gear which is not shown. The arrangement is such that the driving wheels Wf and Wf' are steered by rotating the knuckles 102 around the king pins 103 by rotating the steering wheel 13.

The back plate 104 of the braking device B (drum-type braking device in the illustrated embodiment) of each of the driving wheels Wf and Wf' is connected to the corresponding knuckle 102. In order to prevent the rotation of the back plate 104, a suppressing arm 105 projected from the outer side surface of the outer sleeve 101 is connected to the chassis frame F through a torque rod 106. Therefore, at the time of the braking, the braking torque acting on the back plate 104 is born by the chassis frame F through the knuckle 102, outer sleeve 101 and the torque rod 106. When the power unit P is oscillated around the pivot shaft 83, relative rotational displacements are allowed in the connections of the knuckle 102, outer sleeve 101 and the supporting sleeve 100, in order to assure appropriate alignment of the driving wheels Wf and Wf'.

A rear fork 111 is connected to the rear end of the frame F for free vertical oscillating motion through a pivot shaft 110. The non-powered rear wheel Wr of the vehicle is rotatably supported by the rear end of the rear fork 111. In order to suspend the rear fork 111, a spring device Sr similar to the aforementioned Neidhart spring Sf is disposed between the pivot shaft 110 and the rear fork 111. A hydraulic damper 112 for damping the vertical movement of the rear wheel Wr is disposed between the rear fork 111 and the chassis frame F.

The use of the Neidhart spring as the suspension device is not the only form of suspension that may be used but rather exclusive the wheel suspension may be of other types such as expandable type incorporating a coiled spring disposed between a rocker arm fixed to the pivot shaft and the chassis frame.

Although the invention has been described through specific terms, it will be clear to those skilled in the art that the described embodiment is only illustrative and various changes and modifications may be imparted thereto without departing from the scope of the invention which is defined solely by the appended claims.

What is claimed is:

1. A vehicle having driving wheels both on the left and right sides of the chassis frame thereof comprising: a power unit including an engine and a transmission system for transmitting the power from an output shaft of said engine to said driving wheels independently, said power unit having a casing constructed as a rigid member for supporting said driving wheels and pivotally connected through a pivot shaft to said chassis frame so as to permit vertical movement of said driving wheels, said transmission system including a differential gear means having a case connected through speed reduction gears to said output shaft, said differential gear means including left and right side output gears, said transmission system including left and right input drive shafts extending laterally from said left and right side output gears of said differential gear means, said transmission system including left and right output sections to which said input drive shafts are drivingly connected and output shafts connected to the respective driving wheels, and said output sections including V-belt type automatic transmissions connected between the input drive shafts and the output shafts.

2. A vehicle according to claim 1, wherein said engine is disposed at the front end of said chassis frame, said input drive shafts of said transmission system being extended to left and right sides of said engine, while said output sections of the same are extended rearwardly so as to sandwich said chassis frame therebetween, said vehicle further including a suspension spring device disposed between said casing and said chassis frame, and auxiliary equipment annexed to said engine and attached to the left and right side surfaces of said engine in close proximity of said input drive shafts.

3. A vehicle according to claim 1 wherein each of said V-belt type transmission has a transmission case composed of a seamless case body having a cylindrical form diverging from the end near said input drive shaft towards the opposite end and opened at the end surface adjacent to said output shaft, and a cover member attached to said case body so as to close said open surface.

4. A vehicle according to claim 1 wherein each said V-belt type transmission has a transmission case composed of a seamless case body having a cylindrical form diverging from the end near said input section towards the, opposite end and opened at the end surface adjacent to said input drive shaft, and a cover member attached to said case body so as to close said open surface.

5. A vehicle according to claim 4 wherein each said transmission case is also opened at the end surface adjacent to said output shaft, and a cover member is attached to said case body so as to close said open surface at the output shaft.

6. A vehicle having driving wheels both on the left and right sides of a chassis frame thereof, comprising a power unit including an engine and a transmission system for transmitting the power from an output shaft of said engine to said driving wheels independently, said power unit having a rigid casing serving as a stabilizer for supporting said driving wheels as well as for suppressing vibration of the wheels, said casing being pivotally connected through a pivot shaft to said chassis frame so as to permit vertical movement of said driving wheels, said transmission system including a differential gear means having a case connected to said output shaft and left and right side gears, left and right input sections extending from the respective left and right side gears, and output sections through which said input sections are drivingly connected to the respective driving wheels, said vehicle further comprising a suspension spring device disposed between said casing and said chassis frame, wherein a reduction gear means is provided through which said output shaft is connected to a crankshaft of said engine, said pivot shaft being disposed in close proximity to said reduction gear means, and wherein said engine is disposed at a front end of said chassis frame, said input sections of said transmission system being extended to left and right sides of said engine, while said output sections of the transmission system are extended rearwardly so as to sandwich said chassis frame therebetween.

7. A vehicle according to claim 6, wherein said output sections include V-belt type automatic transmissions.

8. A vehicle according to claim 6, further comprising auxiliary equipment annexed to said engine and attached to left and right side surfaces of said engine in close proximity of the input sections.

9. A vehicle according to claim 6, wherein said pivot shaft is located rearwardly of the engine and forwardly of the driving wheels.

10. A vehicle according to claim 6, wherein each of said V-belt type transmissions has a transmission case composed of a seamless case body having a cylindrical form diverging from an end thereof near said input section towards an opposite end and opened at an end surface adjacent to said output shaft, and a cover member attached to said case body so as to close said open surface.

11. A vehicle according to claim 10, wherein said transmission case further has a second open surface opened at an end surface near said input section, said second open surface opening toward a direction opposite to that to which said first-mentioned open surface opens, said second open surface being closed by a second cover member.

* * * * *